July 27, 1943.        P. BOISSOU        2,325,469
PIPING ELEMENT
Filed Sept. 5, 1939        2 Sheets-Sheet 1
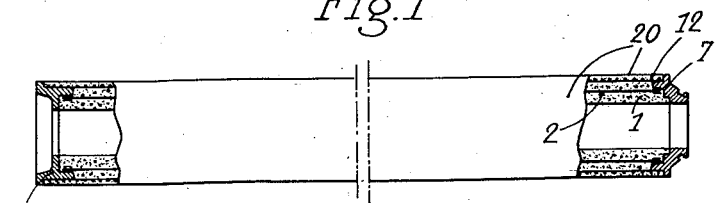
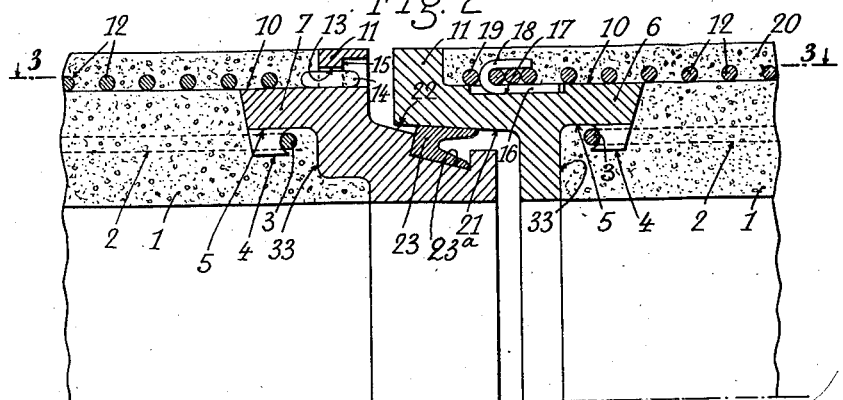
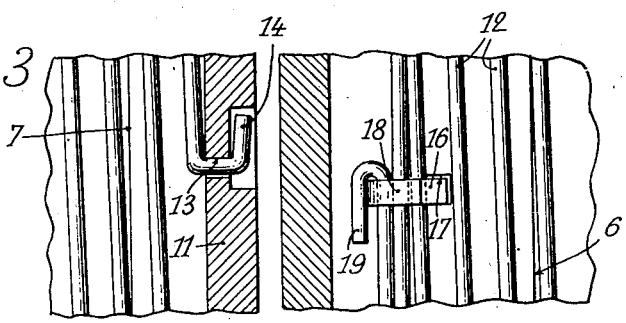
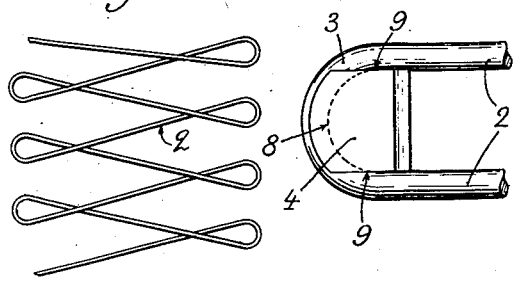
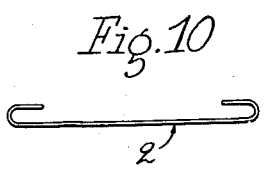
Pierre Boissou
BY   Otto Munk
HIS ATTORNEY July 27, 1943.  P. BOISSOU  2,325,469
PIPING ELEMENT
Filed Sept. 5, 1939  2 Sheets-Sheet 2
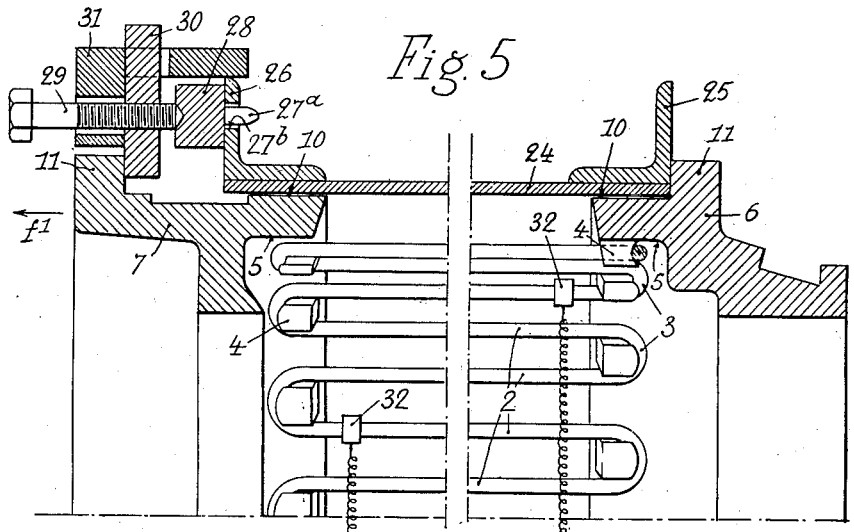
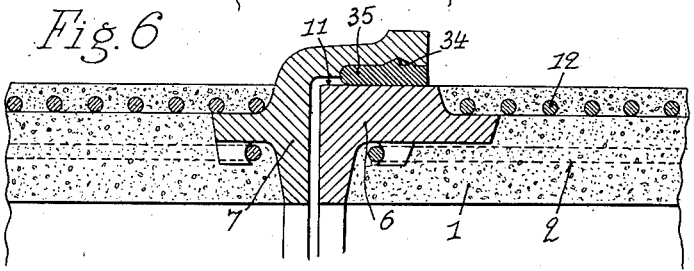
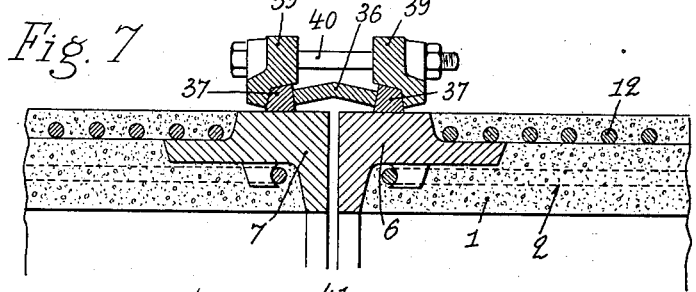
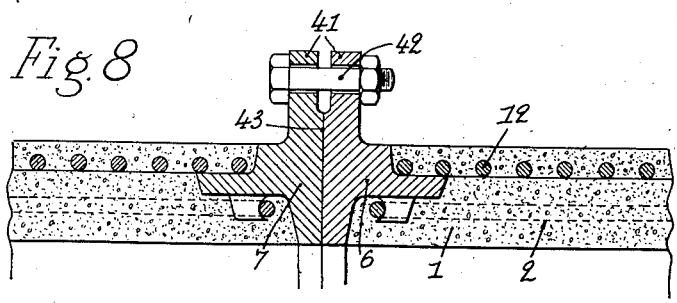

Patented July 27, 1943

2,325,469

UNITED STATES PATENT OFFICE 2,325,469

PIPING ELEMENT

Pierre Boissou, Pont a Mousson, Meurthe et Moselle, France; vested in the Alien Property Custodian Application September 5, 1939, Serial No. 293,418 In France September 15, 1938

2 Claims. (Cl. 285—112)

The present invention consists of a pipe, a pipe coupling member or any other piping element, which comprises a portion consisting of reinforced concrete or like material and two metal end-pieces which are provided with parts adapted for the hooking of the ends of the longitudinal reinforcements.

The said reinforcements may consist, for example, of one or more wires bent in zigzag form with parallel or crossed longitudinal strands, or of separate wires having loops at the ends.

According to a further feature, the said end-pieces are also hooked to a metal transverse reinforcement of the middle portion of the pipe or other piece, this reinforcement of the core of the pipe being if desired covered with an outer protecting layer of concrete or other material.

The invention further consists of a process for the manufacture of pipes or like piping elements of the aforesaid type, which process comprises placing and maintaining the longitudinal reinforcements under tension before, during and after the pouring of the concrete and until the setting has taken place, by drawing apart the end-pieces.

The drawing apart of the end-pieces is preferably preceded by a heating, for instance electric, of the reinforcements, whose object is to effect their momentary expansion and thus to facilitate the drawing apart of the end-pieces whereby the tensioning takes place automatically upon the cooling of the reinforcements.

The invention further consists of the outfit for carrying out the said process. In the accompanying drawings, which are given solely by way of example:

Fig. 1 is a view on a small scale, with parts broken away, of a pipe according to the invention.

Fig. 2 is a longitudinal section on a larger scale, of the assemblage of two pipes according to the invention.

Fig. 3 is a partial development, in section on the line 3—3 of Fig. 2.

Fig. 4 is a front view, on a large scale, of one of the hooks by which either one of the end-pieces can be attached to the longitudinal reinforcements.

Fig. 5 is a longitudinal section of the outfit required for the manufacture of a pipe according to the invention, the reinforcements being placed under tension by drawing apart the end pieces.

Figs. 6, 7 and 8 are longitudinal sections of modified forms of end-pieces and of the corresponding assemblages.

Figs. 9 and 10 show two modifications of the arrangement of the longitudinal reinforcements.

In the embodiment shown in Figs. 1 to 5, the pipe consists of a concrete core 1 which is reinforced by longitudinal reinforcements 2. These reinforcements consist of one or more wires arranged in zigzag and the longitudinal strands of which are formed with loops 3 at their ends (Figs. 2, 4 and 5). The said loops 3 are attached to hook-shaped projections 4 provided in the interior of a cylindrical recess 5 formed in each of two metal pieces 6 and 7 which are provided at the ends of the pipes and serve for the coupling of the pipes. The hooks 4 (Fig. 4) have a torus-shaped groove 8 adapted for the engagement of the loop 3 of the corresponding reinforcement. At the sides, each hook 4 has two longitudinal flat parts 9 the spacing of which is equal to the spacing between the two corresponding strands 2 of the reinforcement, so that the reinforcement can be attached without difficulty and without distortion of the loop 3.

At the exterior, the end-pieces 6 and 7 have a cylindrical surface 10 which is flush with the outer cylindrical surface of the core 1, and comprises bosses or preferably a continuous shoulder or collar 11.

Upon the cylindrical surfaces 10 of the two end-pieces and upon the said core, is wound, under tension, a helical transverse reinforcement 12 the ends of which are attached to the two end-pieces. The ends of the transverse reinforcing wire or wires can be attached by inserting them into a hole 13 provided in the collar 11 of the end-piece 7 (Figs. 2 and 3), such ends being then bent around at 90° in the form of a hook into a recess 15 provided in the outer end face of the collar 11. At the other end of the pipe the reinforcing wire or wires are wound by their last spiral turns upon a plate 16 which is engaged in a recess 17 in the cylindrical surface 10 of the end-piece 6 and in which it is held by said last spiral turns of the reinforcement. The end of the place 16 is upturned in the form of a hook 18 which overlays the said last spirals of the reinforcement. The end of the reinforcing wire is turned at 19 about the hook formed by the said plate.

The helical transverse reinforcement 12 is preferably provided with a covering 20 of concrete or like material.

The outer ends of said end-pieces are preferably disposed in such manner as to provide for a tight joint between the pipes, and the said end-pieces may comprise, as herein represented, for one end-piece 6 a tapered bell portion 21 (Fig. 2), and for the other 7 a male part 22 of corresponding shape. The tightness may be ensured by a channel shaped packing member 23 which is located in a recess 23ª provided in one of the two end-pieces and is such that the pressure of the fluid in the piping will apply the two flanges of the member 23 upon the adjacent surfaces of the two end-pieces.

Fig. 5 shows, in longitudinal section, the equipment required for the tensioning of the longitudinal reinforcements 2 and for the casting of the core 1. This equipment comprises a cylindrical mould 24 consisting of one or more pieces, which mould may be adapted for the casting of concrete by a centrifugal process. At each end, the cylinder 24 is provided at the exterior with two angle-iron members 25 and 26, which are secured by welding or otherwise. One of the said members 26, at least, may be provided, by means of pins 27 inserted into holes 27ᵇ, for example, with a ring 28 adapted to cooperate with screws 29, screwed into keys 30 which are inserted radially into a guiding ring 31. Moreover, the equipment preferably comprises electric terminals 32 for the supply of current to different points of the reinforcement, which points have preferably an equal spacing. For instance, in the case of a supply of direct or single-phase current, it is feasible to employ two or an even number of terminals 32 which may consist of strong gripping devices. For three-phase current, use will be made, on the contrary, of a number of equally spaced terminals which is a multiple of three. The operation is as follows.

The end-piece 6 is first engaged in the mould 24. Then there are inserted through the other end of the mould the reinforcements in zigzag 2 whose strands are attached by their loops 3 to the hooks 4 of the end-piece 6. When this has been done, the other end-piece 7 is inserted into the other end of the mould, and its hooks 4 can be readily attached to the loops 3 of the reinforcements 2, owing to the play between the collar 11 of the end-piece 7 and the angle bracket 26 of the mould.

The ring 28 and the ring 31 are then put in place, and the keys 30 are inserted. Into each of said keys 30 there is screwed one of the screws 29 until engagement with the ring 28.

The ends of the keys 30 will bear upon the shoulder 11 of the end-piece 7, and will thus exert upon the latter, by bearing upon the ring 28 and hence upon the mould 24, a traction in the direction of the arrow $f^1$. Since the other end-piece bears by its shoulder upon the anglebracket 25 and on the other end of the mould 24, it will be understood that the screwing of the screws 29 will permit of exerting and/or of maintaining a tractive force upon the reinforcements 2.

The tensioning can be facilitated to advantage by a preliminary heating, preferably electric, of the reinforcements 2 by means of said current terminals 32.

In this case, provision is made, according to the invention, for the electrical insulation of said reinforcements from the hooks 4, for instance by covering their loops 3 with an insulating coating or varnish.

In the case of such heating, the reinforcements 2 are first heated to provide for their elongation, and they are then simply stretched by means of the screws 29, whereby upon cooling down of the said reinforcements, they will be automatically tensioned.

When the tension has been obtained by either of the aforesaid means, or by the two combined, the next step is the casting of the concrete core 1, for instance by the centrifugal process. After the setting, the screws 29 are released, and the keys 30 are successively removed, as well as the ring 31 and the ring 28. From this time, the longitudinal stress exerted by the reinforcements upon the end-pieces 6 and 7 will be counterbalanced by a longitudinal compression of the concrete 1. This compression is made absolutely uniform by reason of the great internal contact surface 33 of the end-pieces. This will prevent all excessive local stress upon the concrete which is still fresh, and hence the pipe can be much more rapidly removed from the mould whereby a better utilization of the equipment is provided for and the cost price of the pipes is considerably reduced.

After the removal from the mould, the next step is the transverse reinforcement with the above-mentioned attaching of the reinforcing wire to the end-pieces 6 and 7, and then the placing of the covering 20 upon this transverse reinforcement.

It should be noted that in the case of the electric insulation of the loops 3 of the reinforcements 2, this insulation may be extended to advantage upon a certain length of the longitudinal strands of the reinforcements; this prevents them from adhering to the concrete, and permits by an elastic working of the corresponding portions of the reinforcements which draw upon the end-pieces, of obtaining a longitudinal compression of the concrete, not only in the region traversed by the reinforcements but also between their loops and the internal bearing surfaces 33 of the end-pieces (Fig. 2).

Fig. 6 represents a modified construction of the joint between two end-pieces 6 and 7. In this modification, the joint consists of a filling 34 of lead or other material which is cast between the outer cylindrical surface of the end-pieces 6 and the bell portion of the adjacent end-piece 7 of the other pipe.

Fig. 7 shows another modification, in which the joint is formed, in the known manner, by two tight washers 37 which are pressed by means of a ring 36 against two rings 39 which are connected together by longitudinal bolts 40.

Fig. 8 represents another modification, in which the two end-pieces 6 and 7 of the two adjacent pipes comprise assembling flanges 41 connected by bolts 42, the end surfaces 43 of the end-pieces being preferably machined, and a packing piece may if desired be placed between these two surfaces.

The principal advantages of the pipes or like pieces according to the invention, aside from the facility of tensioning the reinforcements 2 and the rapid demoulding, are particularly the following:

The end-pieces 6 and 7 can be readily obtained by casting, and they permit of economically uniting in a single piece the members used for hooking the longitudinal reinforcements 2 and the spiral reinforcements 12, the parts for the reception of the packing member, and if desired, tappets for moving the pipe either at the time of the centrifugal casting of the concrete core, or at the time of winding the transverse reinforcement 12, or again, when applying the covering part 20.

The end-pieces 6 and 7 form reinforced parts at the ends of the pipe, which ends are precisely the parts which are the most exposed during handling, manufacture or laying.

Owing to their perfect tightness and preservation, the said end-pieces provide for the use, for the assembling of consecutive pipes or parts of piping, of types of joints which are the best adapted for each use, each joint being utilized with all of its advantages.

Obviously, the invention is not limited to the embodiments herein described and represented, which are given solely by way of example. For instance, the joint may not only be of one of the types represented and described, but it may be of any other known type; in the case of automatic joints, this joint can be placed between the tapered end-pieces or between faces which are perpendicular to the axis of the piping.

The parts used for tensioning may be of the type herein represented or of any other type, and may be placed at either end of the mould.

The heating of the reinforcements may be effected by electric heating as described, or by any other means; in the case of electric heating, the current can be supplied directly to the reinforcements or to the end-pieces themselves, these latter being insulated from each other, or both to the end-pieces and the reinforcements.

Instead of being parallel as shown in Fig. 5, the longitudinal strands of the reinforcements 2 might also be oblique or crossed as shown in Fig. 9. Furthermore, instead of being obtained by bending into zigzag shape one wire of great length, the longitudinal reinforcements might also consist of a series of independent wires having end loops as shown in Fig. 10.

Having now described our invention what we claim as new and desire to secure by Letters Patent is:

1. A piping element comprising a main portion of concrete, longitudinal reinforcing elements embedded in said concrete and including a continuous metal wire bent in zigzag shape forming longitudinal strands running substantially parallel with the longitudinal axis of the piping element and loops connecting together the ends of said strands, said reinforcing wire being under material initial tension sufficient to compensate for the shrinkage of the concrete and to take up the expansion produced by the internal pressure, a metal end piece at each end of said main portion and hook-shaped projections on each end piece for hooking thereto the loops of said wire and allowing a uniform distribution of the tension stresses between said strands.

2. A piping element comprising a main portion of concrete with longitudinal reinforcing wires embedded therein, said reinforcing wires having loops at their ends, a metal end piece at each end of said main portion and projections on each end piece for hooking thereto the loops of said reinforcing wires, the latter being under material initial tension sufficient to compensate for the shrinkage of the concrete and to take up the expansion produced by the internal pressure, said loops and the adjacent portions of the longitudinal reinforcing wires being provided with a coating adapted to prevent adhesion between said loops and adjacent parts and the concrete.

PIERRE BOISSOU.